United States Patent
MacDonald (10) Patent No.: US 10,617,069 B2
(45) Date of Patent: Apr. 14, 2020

(54) RECONFIGURABLE TRELLIS SYSTEM

(71) Applicant: Kevin MacDonald, Mission Viejo, CA (US)

(72) Inventor: Kevin MacDonald, Mission Viejo, CA (US)

( * ) Notice: Subject to any disclaimer, the term of this patent is extended or adjusted under 35 U.S.C. 154(b) by 0 days.

(21) Appl. No.: 16/110,122

(22) Filed: Aug. 23, 2018

(65) Prior Publication Data

US 2018/0359960 A1 Dec. 20, 2018

Related U.S. Application Data

(63) Continuation-in-part of application No. 15/497,025, filed on Apr. 25, 2017, now abandoned, which is a continuation-in-part of application No. 15/282,729, filed on Sep. 30, 2016, now abandoned.

(60) Provisional application No. 62/336,872, filed on May 16, 2016.

(51) Int. Cl.
*A01G 17/06* (2006.01)
*A01G 9/12* (2006.01)

(52) U.S. Cl.
CPC .............. *A01G 17/06* (2013.01); *A01G 9/12* (2013.01)

(58) Field of Classification Search
CPC .......... A01G 17/06; A01G 17/04; A01G 9/12; A01G 17/14; A01G 17/08; Y10T 403/7071
USPC ........... 47/45, 44, 47, 80; 403/171, 175, 176
See application file for complete search history.

(56) References Cited

U.S. PATENT DOCUMENTS

| | | | | |
|---|---|---|---|---|
| 2,839,320 A * | 6/1958 | Hill | ................. | E04G 7/02 135/909 |
| 4,922,653 A * | 5/1990 | Stone | ................. | A01G 17/04 47/45 |
| 5,357,710 A * | 10/1994 | Dulik | ................. | A01G 17/06 47/48.5 |
| 7,017,299 B1 * | 3/2006 | Speed | ................. | A01G 9/12 47/21.1 |
| 9,149,008 B1 * | 10/2015 | Schemmel | ......... | A01G 17/06 |
| 2012/0017501 A1 * | 1/2012 | Koopmeiners | ...... | A01G 9/12 47/45 |

* cited by examiner

*Primary Examiner* — Trinh T Nguyen
(74) *Attorney, Agent, or Firm* — Cionca IP Law P.C.; Marin Cionca (57) ABSTRACT

A system for building a reconfigurable trellis includes at least one slidable pole connector configured to slide along a pole having either a circular or rectangular cross-section. The slidable pole connector includes a first portion configured to slide along a first pole and a second portion extending perpendicularly from the first portion and configured to receive an end of a second pole. The first portion may be in the form of a sleeve, which may be unitary or may include two detachably connected parts. A tightening mechanism may be provided to secure the first portion against the first pole and to prevent further sliding of the first portion when the connector is in a desired position. Several slidable pole connectors may be used with one another and with strand or rope connectors to secure a plurality of vertical poles, horizontal poles, and ropes, cables, strings, or or wires to one another in a variety of adjustable configurations.

5 Claims, 8 Drawing Sheets

FIG. 10B

RECONFIGURABLE TRELLIS SYSTEM

CROSS-REFERENCE TO RELATED APPLICATIONS

This application is a continuation-in-part of U.S. non-provisional application Ser. No. 15/497,025, filed Apr. 25, 2017, which is a continuation-in-part of U.S. non-provisional application Ser. No. 15/282,729, filed Sep. 30, 2016, which claims the benefit of U.S. provisional application Ser. No. 62/336,872 filed May 16, 2016, the disclosures of which are hereby incorporated in their entirety by reference herein.

TECHNICAL FIELD

The present disclosure relates to horticulture and, more particularly, to plant support systems. More specifically, the disclosure relates to a system for building a reconfigurable trellis.

BACKGROUND

Certain plants form climbing vines. To support and control the direction in which the vines grow, plant growers build trellis systems. A conventional trellis system may include a set of strands such as wires, cables, strings, or ropes that extend across a frame made of light wooden or metal bars, bamboo poles, or plastic pipe. In the past, attempts have been made to provide trellis frames with vertically extensible elements that allow the height of the frame to be adjusted as the plants grow, as well as with horizontally extensible elements that allow the frame to be built above planting boxes or tables of different sizes. However, none of these adjustable trellis frames have been commercially successful, possibly because the adjustment mechanisms have been difficult to use. There is no currently available system that allows consumers to quickly assemble a trellis system to their own specifications, and to easily adjust, disassemble, and reconfigure the system as their needs change. The above problems are addressed by this disclosure as summarized below.

SUMMARY

A system for building a reconfigurable trellis according to the present disclosure includes at least one slidable pole connector for securing a pair of horizontally extending poles to a vertically extending pole, and at least one strand connector for connecting a strand to one of the poles.

In some embodiments of the disclosure, the slidable pole connector includes a first portion configured to slide along a first pole and a second portion extending perpendicularly from the first portion and configured to receive an end of a second pole. The first portion may be a cylindrical sleeve configured to encircle the first pole and the second portion may be a first tubular boss extending perpendicular to the cylindrical sleeve and configured to encircle the second pole. The slidable pole connector may also include a second tubular boss that extends perpendicular to both the cylindrical sleeve and the first tubular boss. Alternatively, the second tubular boss may be coaxial with the first tubular boss.

The slidable pole connector may also include a tightening mechanism configured to secure the first portion against the first pole and to prevent further sliding of the first portion when the connector is in a desired position. In one embodiment, the tightening mechanism is an annular clamp that surrounds a plurality of resilient fingers formed at one end of the first portion. A latch may be provided for moving the clamp between a compressed configuration and an expanded configuration. In the compressed configuration, the clamp forces the resilient fingers against the first pole, preventing the connector from sliding. In the expanded configuration, the clamp releases its force on the resilient fingers, allowing them to spring away from the pole, allowing the connector to slide freely. In another embodiment, the tightening mechanism is a fastener having a shank configured to extend through the first portion, and a head formed at the proximal end of the shank. The head is configured to be manipulated to drive the distal end against the first pole, thereby preventing the slidable pole connector from sliding further along the first pole. The fastener may be threaded, and the head may be enlarged to facilitate manual rotation of the fastener.

In some embodiments of the disclosure, the strand connector includes a tubular sleeve configured to be removably mounted on the pole, and a pad eye projecting perpendicularly from the sleeve and configured to hold a rope. The pad eye may be a V-shaped member defining a V-shaped opening, wherein the two converging arms forming the sides of the V-shaped member exert a compressive force on the rope, preventing it from slipping. The tubular sleeve may be formed from two semi-cylindrical members that are mounted for pivotable movement towards one another to define a closed configuration and away from one another to define an open configuration. A fastening assembly may be provided for securing the two semi-cylindrical members together in the closed configuration.

In one embodiment, the fastening assembly of the strand connector is a toggle latch. In another embodiment, the fastening assembly includes a first flange extending perpendicularly from an edge of one the semi-cylindrical members and a second flange extending perpendicularly from an edge of the other semi-cylindrical member. Each flange has an opening that aligns with the opening in the other flange when the semi-cylindrical members are in the closed configuration. A fastener such as bolt may extend through the aligned openings, and a retainer such as a nut may be provided for holding the fastener in place.

In some embodiments of the disclosure, the system may include a first slidable pole connector configured to slide along a first vertical pole and a second slidable pole connector configured to slide along a second vertical pole. The first slidable pole connector includes a first cylindrical sleeve, a first tubular boss extending perpendicularly from the first cylindrical sleeve and configured to receive a first end of a first horizontal pole, and a second tubular boss extending perpendicularly from the first cylindrical sleeve and configured to receive a first end of a second horizontal pole. The second slidable pole connector includes a second cylindrical sleeve, a first tubular boss extending perpendicularly from the second cylindrical sleeve and configured to receive a second end of the first horizontal pole, and a second tubular boss extending perpendicularly from the second cylindrical sleeve and configured to receive a first end of a third horizontal pole. At least one of the slidable pole connectors may include a tightening mechanism configured to secure the first portion against the first pole and to prevent further sliding of the first portion when the connector is in a desired position. The system may also include at least one rope connector configured to be removably mounted on one of the horizontal poles.

In some embodiments, the slidable pole connectors may be configured to slide along poles having rectangular, rather than circular, cross-sections. In these embodiments, the sleeves have rectangular cross-sections and may include two half sleeves that fit together over the pole.

Additional slidable pole connectors and strand connectors may be provided as needed, allowing consumers to increase the number of vertical poles, horizontal poles, and ropes in the framework as their gardening requirements change.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
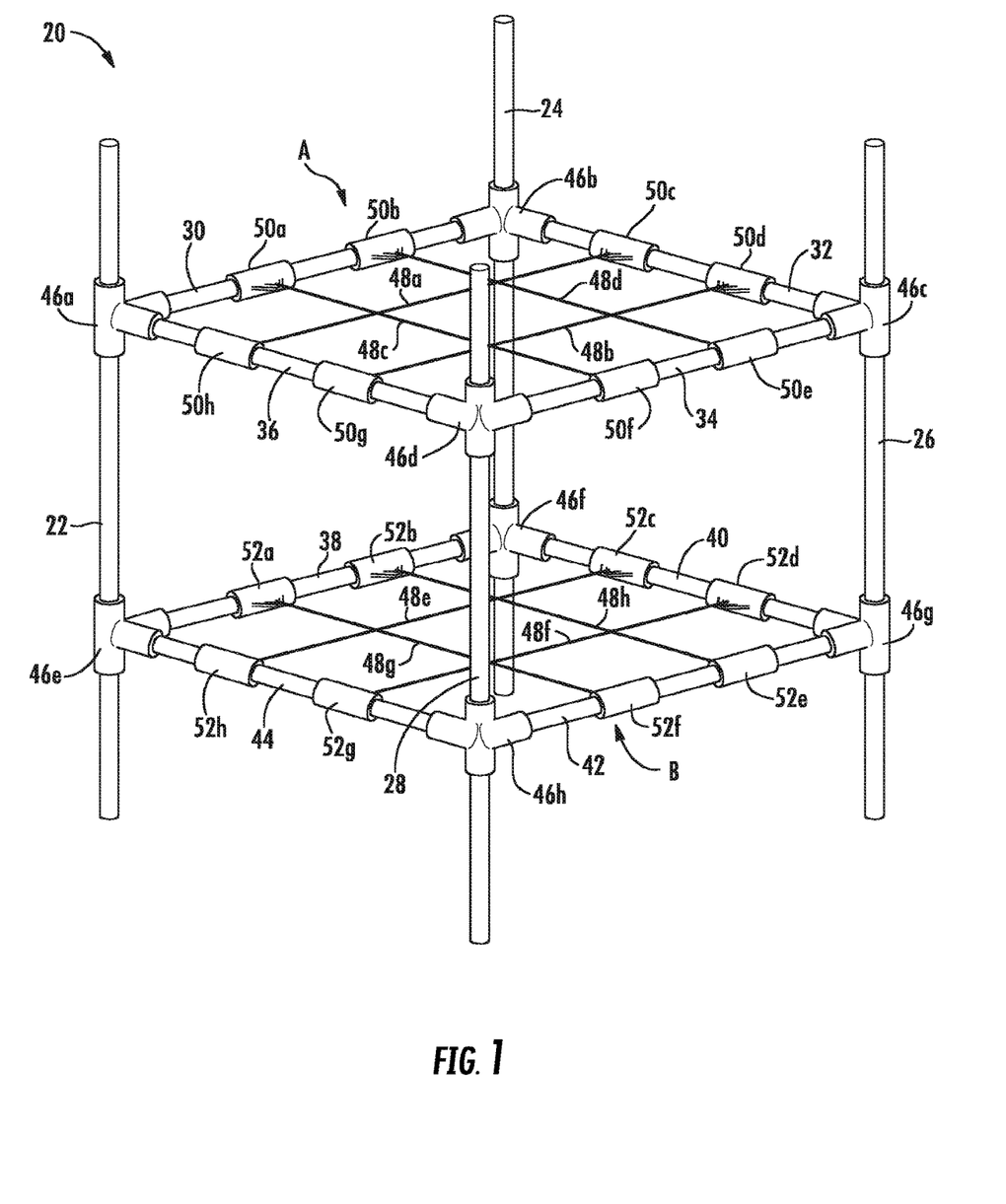
FIG. 1 is a perspective view showing one configuration of a trellis built with the system of the present disclosure.

The present disclosure relates to a system for building a reconfigurable trellis. Referring to FIG. 1, one configuration that can be built using the system is a trellis 20 including two adjustable platforms (levels A and B) that are formed as follows. Four vertical poles 22, 24, 26, and 28 are positioned at each corner to define a rectangle within them. The vertical poles 22, 24, 26, and 28 may be inserted directly into the ground for an outdoor system, or they be supported by a rectangular box or table for an indoor system. A horizontal pole is connected to and positioned between each vertical pole. More specifically, horizontal pole 30 is connected to and positioned between vertical poles 22 and 24. Horizontal pole 32 is connected to and positioned between vertical poles 24 and 26. Horizontal pole 34 is connected to and positioned between vertical poles 26 and 28. Horizontal pole 36 is connected to and positioned between vertical poles 22 and 28. Horizontal poles 30, 32, 34, and 36 along with vertical poles 22, 24, 26, and 28 define plane A, which is also referred to as level A.

Below level A is another plane, plane B, defined by horizontal poles 38, 40, 42, and 44. Horizontal pole 38 extends between vertical poles 22 and 24 and is directly below horizontal pole 30. Horizontal pole 40 extends between vertical poles 24 and 26 and is directly below horizontal pole 32. Horizontal pole 42 extends between vertical poles 26 and 28 and is directly below horizontal pole 34. Horizontal pole 44 extends between vertical poles 22 and 28 and is directly below horizontal pole 36. All of the poles in levels A and B may be formed of a plastic material such as polyvinyl chloride (PVC), although other materials may also be suitable. The vertical poles may be larger in diameter than the horizontal poles.

The heights of levels A and B relative to the ground can be adjusted. Stated differently, the distances of levels A and B relative to each other can be adjusted. The height adjustment is done through slidable pole connectors 46a, b, c, d, e, f, g, h, each of which forms a corner of one of the trellis levels A or B, and connects two perpendicularly disposed horizontal poles for sliding movement along a vertical pole. If desired, another level may be built above level A of the trellis, simply by adding another pole connector to the top of each vertical pole 22, 24, 26, 28, and connecting more vertical and horizontal poles. Even more levels may be built, simply by adding as many additional pole connectors and poles as needed.

The trellis 20 may also include a number of horizontally extending ropes, wires, cables, strings, or other strands of material that may support plants and also divide the space within trellis into separate sections. In the illustrated embodiment, the strands are ropes 48a, b, c, d, e, f, g, h that are slidably and removably connected to the horizontal poles by strand or rope connectors 50 a, b, c, d, e, f, g, h. Trellis level A supports a mesh formed by two laterally extending ropes 48a, b that extend between horizontal poles 32 and 36 and cross over or under two transversely extending ropes 48c, d that extend between horizontal poles 30 and 34. Similarly, Trellis level B supports a mesh formed by laterally extending ropes 48e,f, and transversely extending ropes 48g, h that are supported by rope connectors 52a, b, c, d, e, f, g, h. The distance between two parallel ropes may be varied simply by sliding the connectors supporting those ropes toward or away from one another. In other embodiments, additional ropes and rope connectors may be added to create a finer mesh. Alternatively, some or all of the ropes and rope connectors may be removed. For instance, all of the ropes and rope connectors may be removed from one of the levels, leaving a mesh on only one level, or all of the ropes and rope connectors extending in one direction may be removed so that the remaining ropes form a set of parallel rows rather than a mesh. In such an arrangement, it may be possible to remove some of the horizontal poles as well. In some embodiments, all but one of the horizontal poles may be removed, with the single remaining bar supporting rope connectors holding ropes that extend diagonally to the ground to support grape vines or the like.

Figure 2:
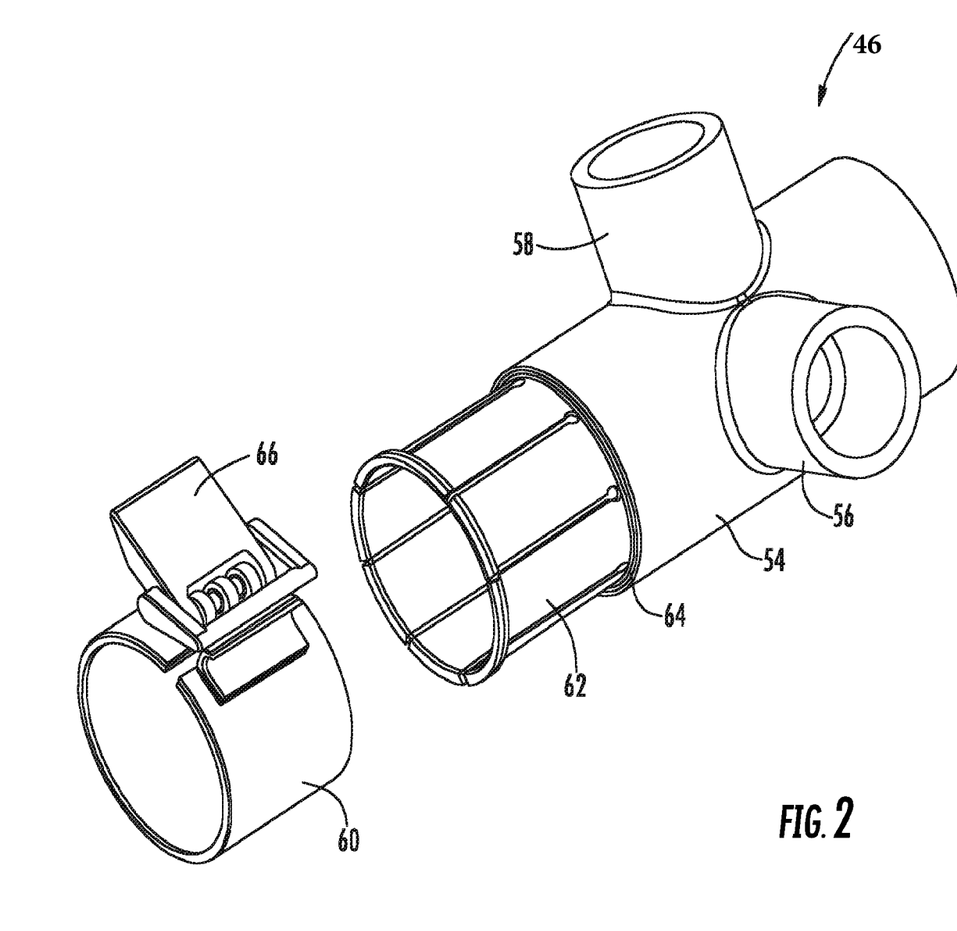
FIG. 2 is an exploded perspective view showing a first embodiment of a slidable pole connector according to the present disclosure.

FIG. 2 shows one of the slidable pipe connectors 46 used to build the trellis 20 of FIG. 1. The connector 46, which may be formed of PVC or a similar material, comprises a cylindrical sleeve 54 having an internal diameter that is slightly larger than the external diameter of one of the vertical poles 22, 24, 26, 28, so as to allow sliding movement thereon. A first tubular boss 56 extends perpendicularly from the sleeve 54, and a second tubular boss 58 extends perpendicularly from both sleeve 54 and first tubular boss 56. Each of the bosses 56, 58 has an internal diameter that is selected to closely and securely receive an end of one of the horizontal poles 30, 32, 34, 36, 38, 40, 42, 44.

A fastening mechanism is provided for releasably securing the slidable pipe connector 46 to one of the vertical poles 22, 24, 26, 28. The fastening mechanism comprises an annular clamp 60 secured over a plurality of resilient fingers 62 formed at a lower end 64 of the sleeve 54. A toggle latch 66 is provided for moving the clamp 60 between a compressed configuration and an expanded configuration. In the compressed configuration, the clamp 60 forces the resilient fingers 62 against a vertical pole, preventing the slidable connector 46 from sliding. In the expanded configuration, the clamp 60 releases its force on the resilient fingers 62, allowing them to spring away from the pole, allowing the slidable connector 46 to slide freely up and down the pole.

Figure 3:
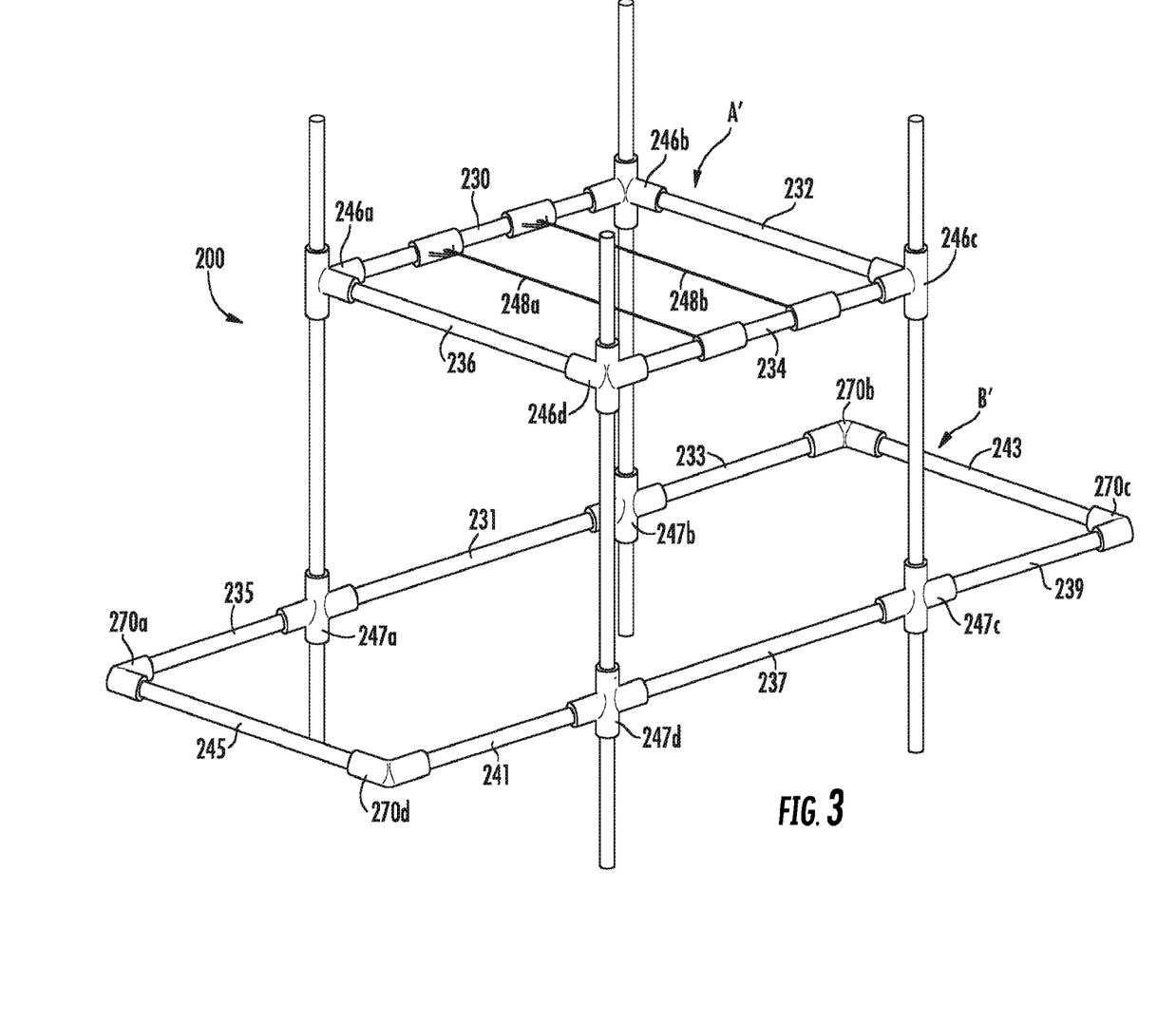
FIG. 3 is a perspective view showing an alternate configuration of a trellis built with the system of the present disclosure.

FIG. 3 shows an alternate configuration of a trellis 200 that may be built using a system according to the present disclosure. In the configuration, level A' of the trellis 200 includes four horizontal poles 230, 232, 234, 236, and is substantially identical to level A of the trellis 20 in FIG. 1, except that only two ropes 248a and 248b are provided, rather than a mesh consisting of four crossing ropes. Level B', which does not include ropes, is wider than level A, and is configured as a rectangle formed from 8 horizontal poles 231, 233, 235, 237, 239, 241, and 243. Horizontal pole 231 is located directly below horizontal pole 230 of level A', and is connected at its opposite ends to horizontal poles 233 and 235 such that the three horizontal poles 231, 233, 235 together define a first long side of the rectangle. Horizontal pole 237 is located directly below horizontal pole 234 of level A1, and is connected at its opposite ends to horizontal poles 239 and 241 such that the three horizontal poles 237, 239, and 241 together define a second long side of the rectangle. Horizontal pole 243 extends transversely between poles 233 and 239 to form a first short side of the rectangle, and horizontal pole 245 extends transversely between poles 235 and 241 to form a second short side of the rectangle. The elongated rectangular configuration of level B' is suitable for supporting three or more trays in the lower level of the trellis. Another embodiment of the invention may reverse the location of levels A' and B'. In other words, the top level may be wider than the bottom.

Figures 4, 5, 5A:
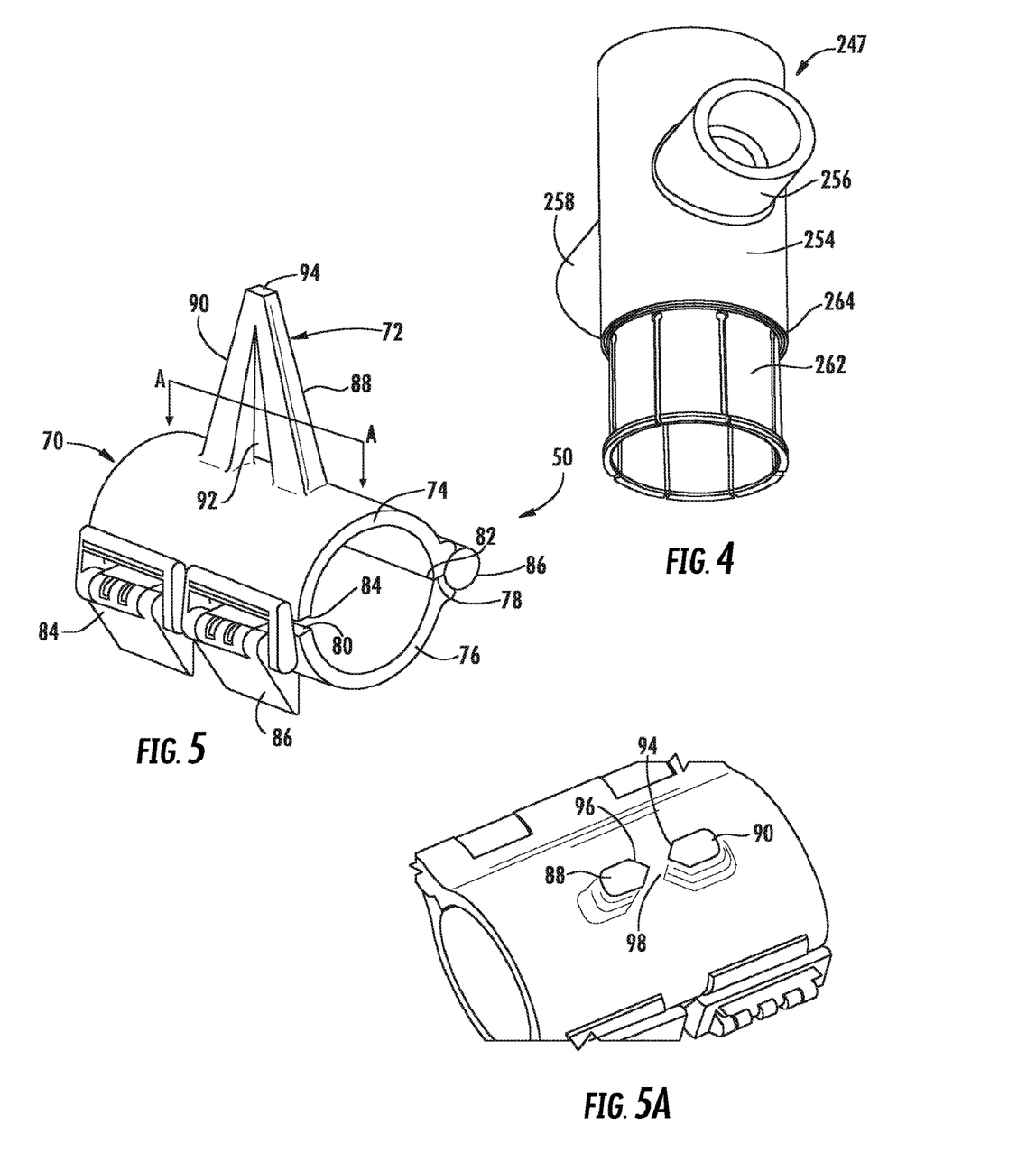
FIG. 4 is perspective view showing a second embodiment of a slidable pole connector according to the present disclosure.
FIG. 5 is a perspective view showing a rope connector according to the present disclosure.
FIG. 5A is a sectional view taken through line A-A of FIG. 5.

The slidable pole connectors 246a, b, c, d, used to connect the horizontal poles 230, 232, 234, 236 of level A' are identical in form and function to the slidable pole connectors 46a, b, c, d used in the embodiment of FIG. 1. However, the slidable pole connectors 247a, b, c, d used in level B' are configured differently, since their function is to connect poles coaxially, rather than perpendicularly, to one another. As shown in FIG. 4, each slidable pole connector 247 includes a cylindrical sleeve 254, a first tubular boss 256 that extends perpendicularly from the cylindrical sleeve 254, and a second tubular boss 258 that extends coaxially with, and in an opposite direction to, the first tubular boss. A set of resilient fingers 262 that extend downwardly from a bottom edge 264 of the sleeve 254, and an annular clamp similar to clamp 60 of FIG. 2 is provided for urging the resilient fingers 262 against a vertical pole.

Figure 9A:
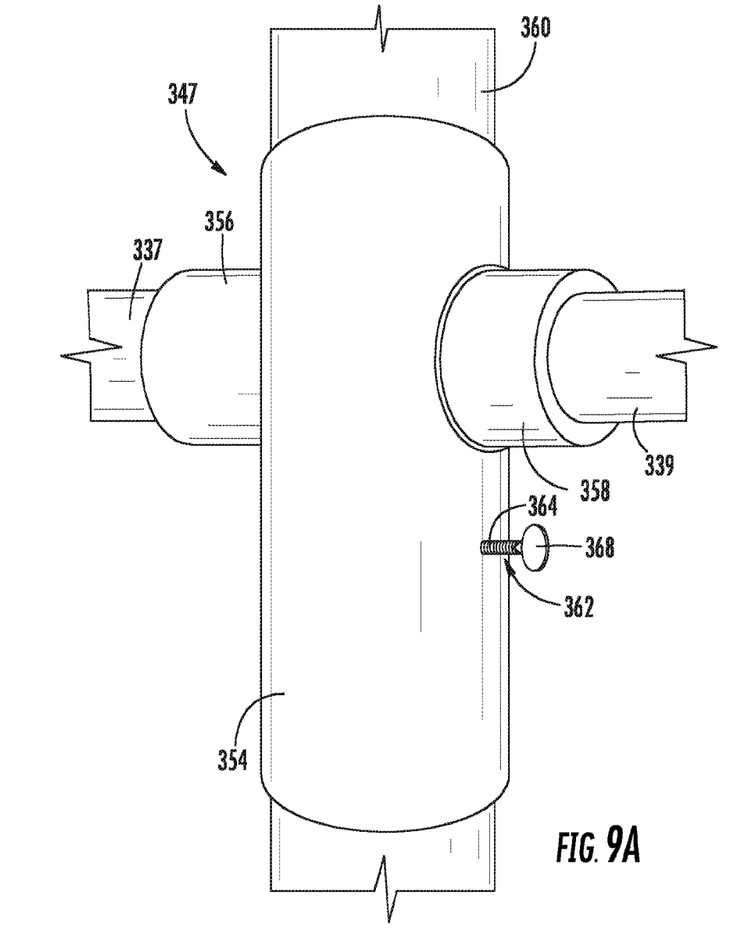
FIG. 9A is a perspective view showing an alternate embodiment of the slidable pole connector joining two horizontal poles to a vertical pole.
Figure 9B:
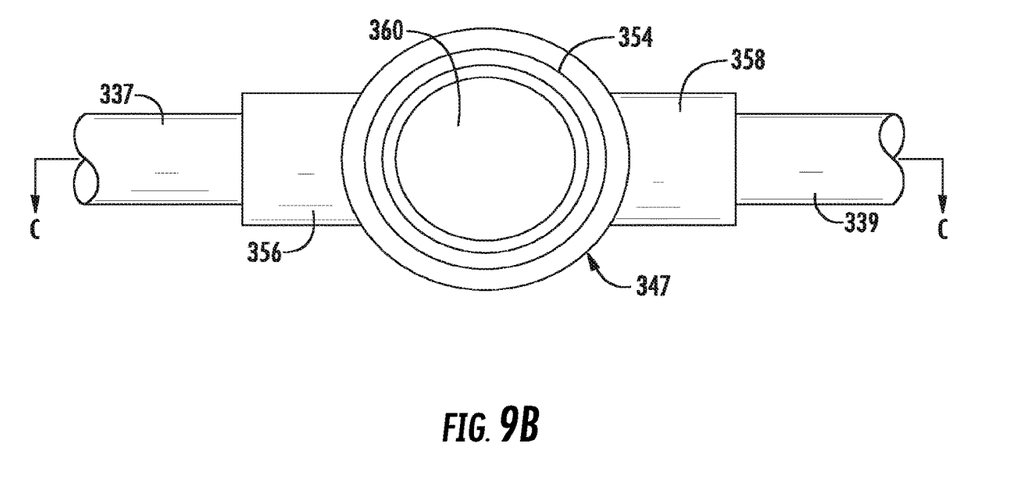
FIG. 9B is a plan view of FIG. 9A.
Figure 9C:
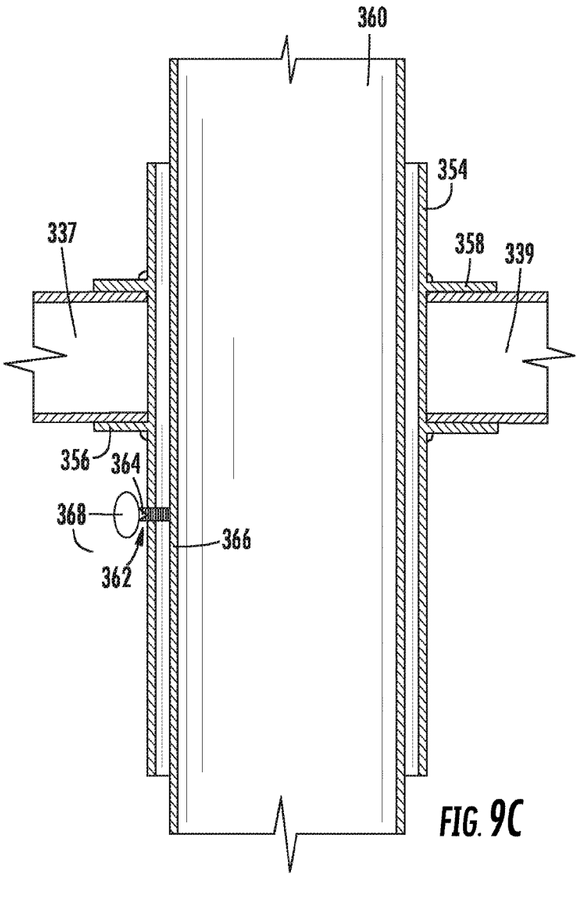
FIG. 9C is a sectional view through line C-C of FIG. 9B.

A slidable pole connector 347 according to an alternate embodiment of the disclosure is shown in FIGS. 9A-9C. Similar to the embodiment of FIG. 4, this slidable pole connector 347 includes a cylindrical sleeve 354 configured to slide along a vertical pole 360, and two oppositely extending tubular bosses 356, 358 configured to receive horizontal poles 337, 339. However, instead of the resilient fingers and annular clamp of FIG. 4, the fastening mechanism for the slidable pole connector 347 comprises a fastener 362 having a shank 364 that extends through the cylindrical sleeve 354, and a distal end 366 configured to press against the outer surface of the vertical pole. The fastener 362 may be a thumb screw having a threaded shank 364, and an enlarged head 368 that can be manually gripped and rotated without the use of tools. Alternatively, the fastener 362 could be a wing screw, a headless set screw, a conventional screw requiring a screwdriver, or other similar fastener.

Figure 10A:
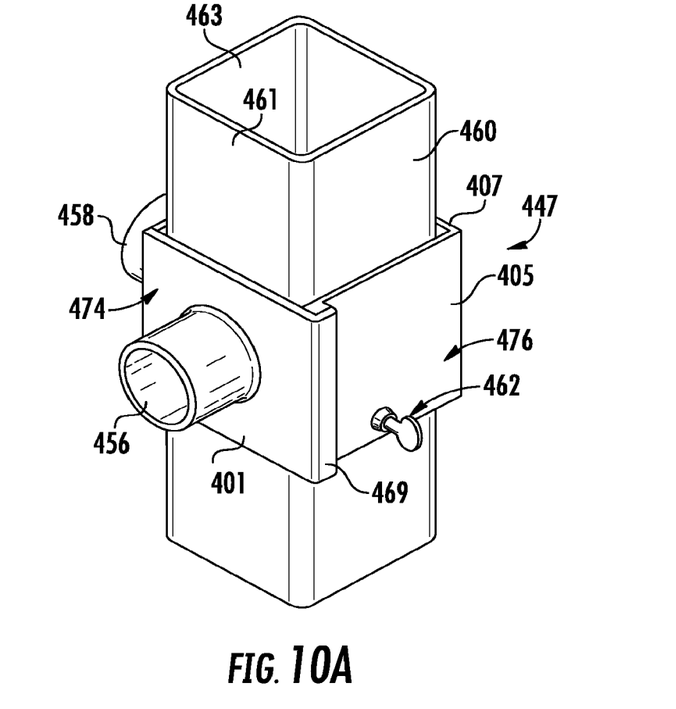
FIG. 10A is a perspective view showing an alternate embodiment of a slidable pole connector for use with poles, rods, bar, or tubes of rectangular cross-section.
Figure 10B:
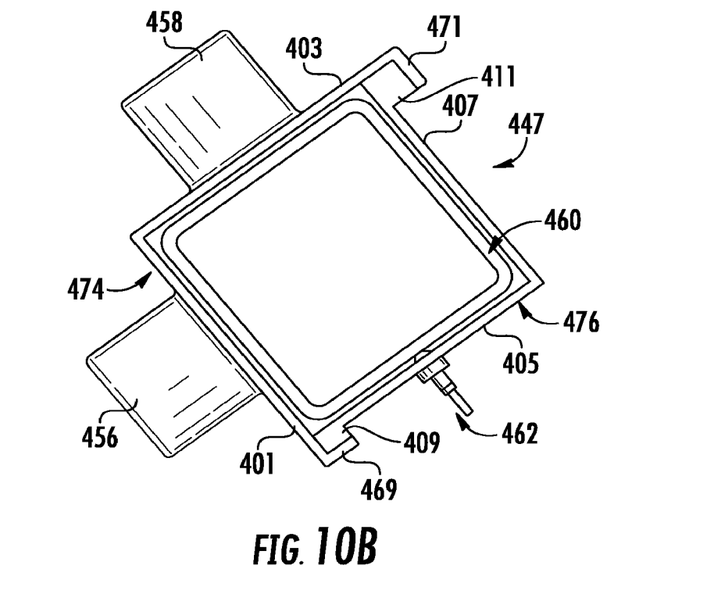
FIG. 10B is a top plan view of FIG. 10A.

A slidable pole connector 447 according to another alternate embodiment of the disclosure is shown in FIGS. 10A and 10B. This pole connector 447, which is designed to slide along a pole, bar, tube, or rod 460 having a rectangular, rather than circular, cross-section, includes a first sliding element 474 and a second sliding element 476 that are coupled together to form a rectangular sleeve. The first sliding element 474 comprises first and second plates 401, 403 that are perpendicularly disposed to one another. A first tubular boss 456 is provided on the first plate 401, and a second tubular boss 458 is provided on the second plate 403. The first plate 401 is slightly longer than the width of the corresponding side 461 of the pole 460, and terminates in a rail 469 that extends parallel to the second plate 403. Similarly, the second plate 403 is slightly longer than the width of the corresponding side 463 of the pole connector, and terminates in a rail 471 that extends parallel to the first plate 401.

The second sliding element 476 also includes first and second plates 405, 407 that are perpendicularly disposed to one another. A first elongated bead 409 is formed at the free end of the first plate 405, and a second elongated bead 411 is formed at the free end of the second plate 407. A fastener 462 similar to the fastener 362 in the embodiment of FIGS. 9A-C extends through the first plate 405. Alternatively, the fastener 462 could extend through one of the plates 401, 403 of the first sliding element 474, rather than of the second sliding element 476.

To assemble the pole connector 447, a user simply places the second sliding element 476 over a corner of the pole 460, and the first sliding element 474 over the opposite corner of the pole 460, and slides the two elements toward one another until the beads 409, 411 on the second element 476 are received within the spaces defined by the rails 469, 471 of the first sliding element and the corresponding sides 461, 463 of the pole 460. The pole connector 447 is then free to slide along the pole 460 until the user tightens the fastener 462.

Other arrangements of securing first and second sliding elements 474, 476 to one another are also included within the scope of this disclosure. For instance, the elements 474, 476 may be snapped together, hinged, bolted, or fastened using any conventional fastener.

Configurations of slidable pole connectors other than those shown in FIGS. 1-4, 9A-C, and 10A-B may also be devised in accordance with the spirit of this disclosure. For instance, the number of tubular bosses may be varied as desired—the second tubular boss may be eliminated for applications where only a single horizontal pole is needed, or a third tubular boss may be added for applications where it is desirable to secure three horizontal poles to a single vertical pole. In some cases, even a fourth boss may be added to allow the connection of a fourth horizontal pole. In addition, conventional pipe connectors may be used on portion of the trellis that are not required to be adjustable. For instance, in the embodiment of FIG. 3, conventional elbow connectors 270a, b, c, d may be used at the corners of trellis layer B.

FIGS. 5 and 5A show a first embodiment of strand or rope connector 50, which may be made from a plastic material such as PVC and includes a cylindrical sleeve 70 configured to be removably mounted on one of the horizontal poles of the trellis, and a pad eye 72 that projects perpendicularly from the sleeve 70. The cylindrical sleeve 70, is preferably formed from two semi-cylindrical members 74, 76. The first semi-cylindrical member 74 includes a first longitudinal edge 78 and a second longitudinal edge 80. The second semi-cylindrical member 76 includes a first longitudinal edge 82 and a second longitudinal edge 84. First longitudinal edges 78 and 82 of first and second semi-cylindrical members 74, 76, respectively, are coupled to one another by a longitudinally extending hinge 86 that allows the semi-cylindrical members 74, 76 to pivot between a closed configuration wherein the second longitudinal edge 80 of the first semi-cylindrical member 74 substantially abuts the second longitudinal edge 84 of the second semi-cylindrical member 76, and an open position wherein the second longitudinal edges 80, 84 of the first and second semi-cylindrical members 74, 76 are spaced further apart from one another. A fastening assembly in the form of a pair of toggle latches 84, 86 is provided for securing the semi-cylindrical members 74, 76 in the closed configuration. The dimensions of the semi-cylindrical members 74, 76 are selected such that, when they are clamped together in a fully closed configuration, the inner diameter of the cylindrical sleeve 70 is substantially equal to the outer diameter the horizontal pole on which the rope connector 50 is mounted. Thus, the rope connector 50 cannot slide along the pole when the semi-cylindrical members 74, 76 are fully closed. When the toggle latches 84, 86 are fully open, the rope connector 50 can be removed from the pole. The toggle latches 84, 86 preferably also allow a partly open configuration, which allows the rope connector 50 to slide horizontally along the pole.

The pad eye 72 of the rope connector 50 preferably includes a pair of arms 88, 90 that project perpendicularly from the second semi-cylindrical member 74 and converge toward one another to define a V-shaped opening 92. Each arm 88, 90 may be tapered in a distal direction. Alternatively stated, the width of each arm 88, 90 may decrease towards the distal end 94 of the pad eye 72. In addition, each arm 88, 90 includes a V-shaped side wall 94, 96 projecting into the opening 92. Together the two V-shaped side walls 94, 96 form a substantially hourglass-shaped passageway 98 for receiving a rope other strand. Both the V-shaped configuration of opening 92 and the hour-glass shape of passageway 90 cause the arms 88, 90 to exert compressive forces on the rope, reducing the possibility of slippage.

Figure 6:
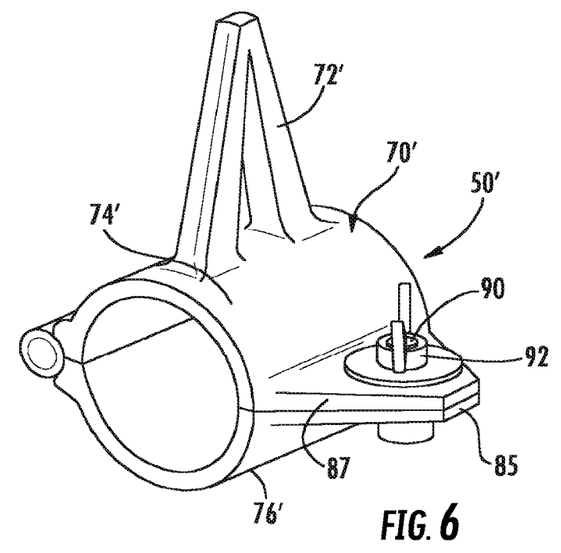
FIG. 6 is a perspective view showing an alternate embodiment of a rope connector according to the present disclosure.

FIG. 6 shows an alternate embodiment of a rope connector 50', wherein the cylindrical sleeve 70' and pad eye 72' are substantially identical to the cylindrical sleeve 70 and pad eye 72 of FIG. 5, but wherein the toggle latches have been replaced with a pair of apertured flanges 85, 87 that extend perpendicularly from the free edges of each semi-cylindrical shell 74', 76', The flanges 85, 87 are releasably secured to one another by a fastener such as a bolt 90 and wing nut 92. In still other embodiments of the invention, the semi-cylindrical shells may be slid, snapped, or fastened to one another as shown and described above in connection with the two-piece pipe connector of FIGS. 10A and B.

Figures 7, 8:
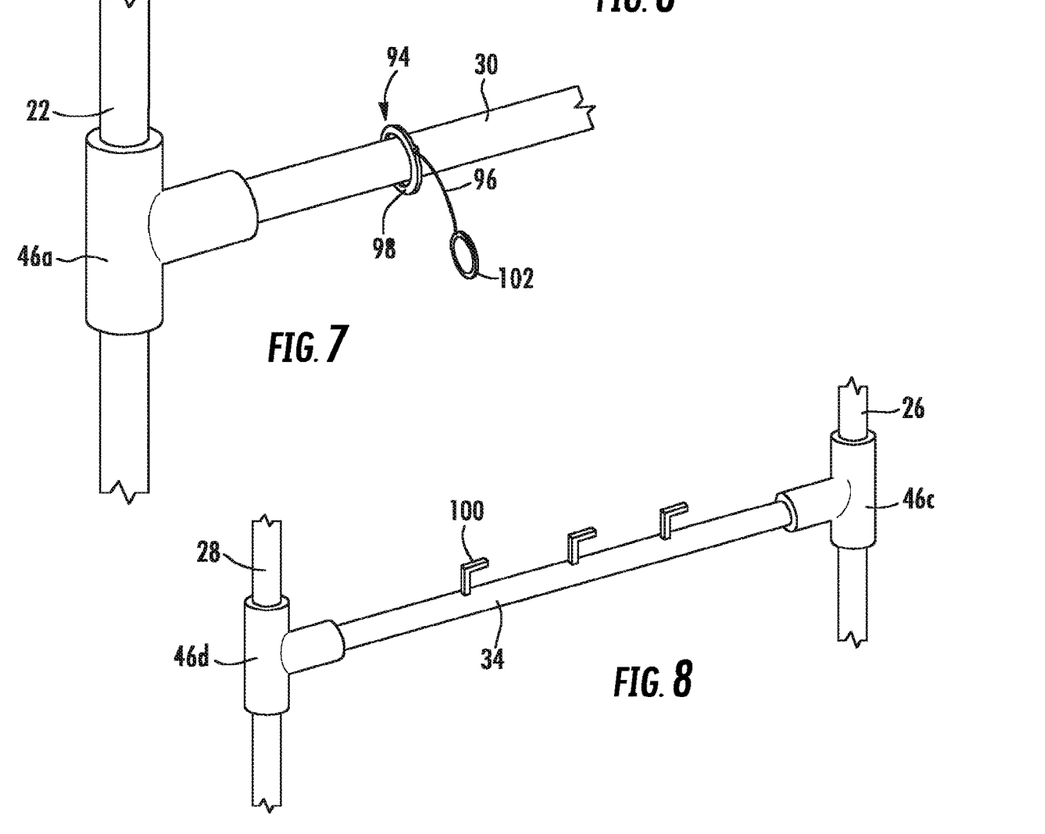
FIG. 7 is a perspective view showing another embodiment of a wire connector according to the present disclosure.
FIG. 8 is a perspective view showing a horizontal pole having wire receivers usable with the wire connector of FIG. 7.

In some situations, it may be preferably to extend retractable wires rather than ropes between horizontal poles of the trellis 20 or 200. In such situations, each wire 96 may be disposed in a coiled configuration in or on an annular reel 98 configured to slide along one of the horizontal poles 30, as shown in FIG. 7. The horizontal pole 34 located opposite horizontal pole 30 may include a plurality of hooks 100, as shown in FIG. 8, that are configured to cooperate with hooks or rings 102 provided at the free end of the wire 96 to maintain the wire 96 in an extended position when needed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. For instance, any of the sleeve configurations shown in FIGS. 2, 4, 9A-C, and 10A-B may be used for a rope connector, and any of the sleeve configurations shown in FIGS. 5A-B and 6 may be used for a pole connector.

What is claimed is:

1. A system for connecting a plurality of elements to build a reconfigurable trellis, comprising:
   a plurality of vertical poles;
   a plurality of horizontal poles;
   a plurality of slidable vertical connectors configured to connect the plurality of vertical poles to the plurality of horizontal poles to form a trellis, each slidable vertical connector including a first portion having an internal diameter that is larger than an external diameter of the vertical poles, so as to allow sliding movement of each slidable vertical connector onto the vertical poles and thus selection of a desired height at which one or more trellis levels are formed by the plurality of horizontal poles once connected to the plurality of vertical poles, a second portion extending perpendicularly from the first portion and configured to receive an end of one of the plurality of horizontal poles;
   a plurality of strands; and
   a plurality of slidable horizontal connectors, each being configured to receive an end of one of the plurality of strands, so that the plurality of strands can be extended within the one or more trellis levels, each of the plurality of slidable horizontal connectors being further configured to slide onto the horizontal poles, such that to allow selective adjustment of a distance between adjacent strands within the one or more trellis levels.

2. A system according to claim 1, wherein the each slidable vertical connector further comprises a tightening mechanism configured to secure the first portion against the vertical pole to prevent further sliding of the slidable vertical connector when the slidable vertical connector is in a desired position.

3. A system according to claim 1, wherein the second portion of each slidable vertical connector comprises a boss extending perpendicularly to the first portion and being configured to surround the end of one of the plurality of horizontal poles.

4. A system according to claim 1, wherein:
   the first portion comprises a sleeve;
   the boss is a first boss; and
   the second portion of each slidable vertical connector comprises a second boss extending perpendicularly with respect to the sleeve and being configured to surround the end of another of the plurality of horizontal poles.

5. A system for connecting a plurality of elements to build a reconfigurable trellis, comprising:
   a plurality of vertical poles;
   a plurality of horizontal poles;
   a plurality of slidable vertical connectors configured to connect the plurality of vertical poles to the plurality of horizontal poles to form a trellis, each slidable vertical connector including a first portion having an internal diameter that is larger than an external diameter of the vertical poles, so as to allow sliding movement of each slidable vertical connector onto the vertical poles and thus allow selection of a desired height at which one or more trellis levels are formed by the plurality of horizontal poles once connected to the plurality of vertical poles, a second portion extending perpendicularly from the first portion and configured to receive an end of one of the plurality of horizontal poles;
   a mesh configured to extend within the one or more trellis levels; and
   a plurality of slidable horizontal connectors, each being configured to receive and secure a portion of the mesh to the plurality of horizontal poles, each of the plurality of slidable horizontal connectors being further configured to slide onto each of the horizontal poles such that to allow selective positioning of the slidable horizontal connectors onto the plurality of horizontal poles.

\* \* \* \* \*